(12) United States Patent
Alper

(10) Patent No.: US 8,394,265 B2
(45) Date of Patent: Mar. 12, 2013

(54) VISUAL BILGEWATER QUALITY INDICATOR

(75) Inventor: Hal Alper, Flowery Branch, GA (US)

(73) Assignee: Mycelx Technologies Corporation, Gainesville, GA (US)

( * ) Notice: Subject to any disclaimer, the term of this patent is extended or adjusted under 35 U.S.C. 154(b) by 0 days.

(21) Appl. No.: 13/475,238

(22) Filed: May 18, 2012

(65) Prior Publication Data

US 2012/0273401 A1 Nov. 1, 2012

Related U.S. Application Data

(63) Continuation of application No. 12/079,244, filed on Mar. 25, 2008, now Pat. No. 8,187,459.

(60) Provisional application No. 60/920,193, filed on Mar. 27, 2007.

(51) Int. Cl.
*B01D 35/143* (2006.01)

(52) U.S. Cl. ............................................. 210/93; 210/95

(58) Field of Classification Search ............... 210/93, 210/94, 95
See application file for complete search history.

(56) References Cited

U.S. PATENT DOCUMENTS

| | | |
|---|---|---|
| 4,512,890 A | 4/1985 | Medbury |
| 5,139,679 A | 8/1992 | Pan et al. |
| 5,401,404 A | 3/1995 | Strauss |
| 5,437,793 A | 8/1995 | Alper |
| 5,698,139 A | 12/1997 | Alper |
| 5,837,146 A | 11/1998 | Alper |
| 5,961,823 A | 10/1999 | Alper |
| 6,180,010 B1 | 1/2001 | Alper |
| 6,391,626 B1 | 5/2002 | Adams et al. |
| 6,475,393 B2 | 11/2002 | Alper |
| 7,264,721 B2 | 9/2007 | Alper |
| 7,264,722 B2 | 9/2007 | Alper |
| 7,597,809 B1 | 10/2009 | Roberts |
| 7,688,428 B2 | 3/2010 | Pearlman |
| 2006/0027507 A1 | 2/2006 | van Leeuwen et al. |

OTHER PUBLICATIONS

Disclosure under 37 CFR 1.56 for U.S. Appl. No. 13/475,238, filed May 25, 2012.

*Primary Examiner* — Terry Cecil

(74) *Attorney, Agent, or Firm* — Sutherland Asbill & Brennan LLP

(57) ABSTRACT

A visual bilgewater quality indicator for use in a bilgewater filtration system which includes a filtration stage for removing oily contaminants. The quality indicator utilizes one or more filtration status chambers which are provided with a fluorescent or phosphorescent dye or pigment treated filtration media. The status chamber has a transparent outer wall. Flow through the status chamber is from the outer lateral wall toward its central axis, whereby oily contaminants in the flow collect selectively at the outer portions of the filtration media which are highly visible to an observer. Oil droplets as small as one micron, are captured and immobilized by the primary filter and are instantly visible against the background of the exemplary dye. If two status chambers are used in series, the second chamber is always kept transparent until complete loading and supersaturating breakthrough at the primary chamber.

6 Claims, 4 Drawing Sheets

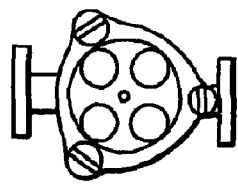
FIG. 3A
FIG. 3
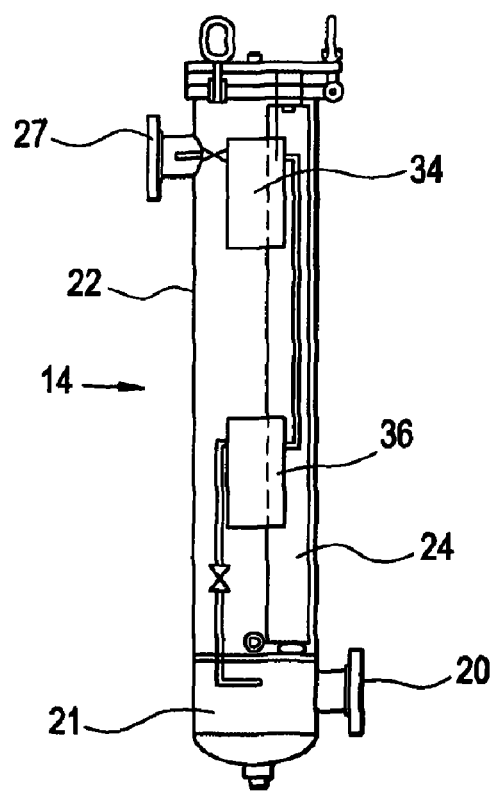
FIG. 3B
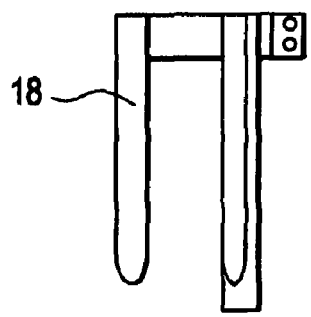
FIG. 3C
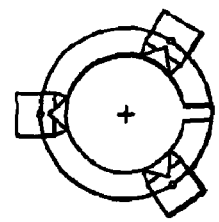

Side View

Top View

VISUAL BILGEWATER QUALITY INDICATOR

RELATED APPLICATIONS

This application is a continuation application of U.S. patent application Ser. No. 12/079,244, filed Mar. 25, 2008, now U.S. Pat. No. 8,187,459, which claims priority from U.S. provisional patent application Ser. No. 60/920,193, filed on Mar. 27, 2007, each of which is incorporated herein by reference in its entirety.

FIELD OF INVENTION

This invention relates generally to methods and filtration devices for removing undesired contaminants from bilgewater discharge, and more specifically relates to apparatus for use in a bilgewater filtration system for visually examining the filtered or partially filtered flowing effluent to determine the efficacy and operational state of the filtration system.

BACKGROUND OF INVENTION

Over the past two decades, U.S. regulations dealing with bilgewater discharge for all types of vessels have grown increasingly stringent. Even the presence of an oil sheen is punishable under federal law. Environmental technology has struggled to keep pace, but until recently no removal method has been capable of eliminating sheen and extracting all harmful contaminants from bilgewater. Federal regulations set a high standard for bilgewater. Even the tiniest drop of bilgewater oil has been demonstrated to kill hundreds of thousands of lobster eggs, just one example of the enormous threat to all aquatic life.

The Federal Water Pollution Act—also known as the Clean Water Act—accordingly proscribes even the appearance of a visible sheen on the water, punishable by a $5,000 penalty. More specifically, the act "prohibits the discharge of oil or oily waste into or upon the navigable waters of the United States or the waters of the contiguous zone if such discharge causes a film or sheen upon, or causes a sludge or emulsion beneath the surface of the water."

Further, under Sections 4301 (a) and (c) of the Oil Pollution Act of 1990, the fine for failing to notify the appropriate federal agency of a discharge has increased from a maximum of $10,000 to a maximum of $250,000 for an individual and $500,000 for an organization. The discharge of oil regulation, or "sheen rule," establishes the following criteria for determining a harmful oil spill:

Discharges that cause a sheen or discoloration on the surface of a body of water;
Discharges that violate applicable water quality standards; or
Discharges that cause a sludge or emulsion to be deposited beneath the surface of the water or on adjoining shorelines.

The sheen rule applies to both petroleum and non-petroleum oils—e.g., vegetable oil.

The discharge regulations also have been toughened for U.S. military vessels. The National Defense Authorization Act of 1996 amended Section 312 of the Federal Water Pollution Control Act to require the Secretary of Defense and the administrator of the U.S. Environmental Protection Agency (EPA) to develop UNDS for vessels of the armed forces for "discharges, other than sewage, incidental to normal operation". Previously, this section only addressed the regulation of sewage.

From an environmental perspective, the increased regulatory activity in bilgewater discharge limits is warranted. The cumulative effect of vessels ranging from small recreational boats to large surface ships dumping even small amounts of bilgewater could wreak damage upon fragile aquatic ecosystems—and likely has already done so.

According to nature of discharge (NOD) reports obtained from the U.S. Navy, the composition of untreated bilgewater is a varying assortment of oil and grease, oxygen-demanding substances, and organic and inorganic materials. These materials, the reports say, include volatile organic compounds, semi-volatile organic compounds, inorganic salts and metals. The common metals collected in bilgewater samples include arsenic, copper, cadmium, chromium, lead, mercury, selenium and zinc, while organics include benzene, isomers of hexachlorocyclohexane, ethyl benzene, heptachlor, heptachlor expoxide, napthalene, phenols, pthalate esters, toluene, trichlorobenzene and trichloroethane.

The primary sources of these contaminants are vessel propulsion systems and auxiliary systems that use fuels, lubricants, hydraulic fluid, antifreeze, solvents and cleaning chemicals. Certain waste streams such as steam condensate, boiler lowdown, drinking fountain water, and sink drainage located in various machinery spaces can also drain to the bilge.

In worst-case scenarios, environmentally irresponsible vessel operators have dealt with excess bilgewater by dumping it overboard. Others have tried to hide the telltale sheen with emulsifiers, though the damage is still done.

Currently, commercial and military surface ships primarily employ two different methods in dealing with bilgewater treatment and removal. Many of these vessels use oil water separator systems to reduce the oil content of bilgewater prior to overboard discharge. Most of these large vessels also have onboard systems for collecting and transferring bilgewater to a holding tank for later removal and disposal on shore.

In the present inventor's U.S. Pat. No. 6,475,393 (also see related U.S. Pat. No. 6,180,010) it is disclosed that the compositions described in the inventor's U.S. Pat. Nos. 5,437, 793; 5,698,139; and 5,837,146, and 5,961,823 (all of which disclosures are hereby incorporated by reference) have extremely strong affinities for the aforementioned contaminants in oily bilgewater; and that when oily bilgewater streams containing these noxious contaminants are passed through filtration media incorporating these compositions, the contaminants are immobilized at the media, as a result of which concentration levels of the contaminants in the filtrate may be reduced to very low values, in some instances below detectable limits in a single pass. This not only enables ready removal from the bilgewater of oils, greases and the like, but as well, removal of pernicious slightly soluble organic compounds such as benzene, toluene, xylene, halogenated hydrocarbons, ethoxylated glycols, etc. These noxious contaminants are among the more difficult compounds to remove from water, and indeed most are carcinogenic. The solubility of the foregoing substances renders most prior art physical separation methods ineffective and causes formation of stable and pseudostable oily emulsions (micelle size of 400 micrometers or less), which also don't respond well to gravity separation due to neutral buoyancy.

In accordance with these prior inventions, the bilgewater is passed through one or more filters incorporating the principles of the earlier inventions, prior to the bilgewater being actually discharged from the vessel. The filter or filters may simply be placed directly in the bilgewater discharge line, e.g. downstream of the bilgewater pump effecting the discharge flow. In a test of a typical such installation, the test results included removal of all sheen and visible discharge.

More specifically the method of the prior invention may be described as one of passing the bilgewater through a fluid-pervious filtration media which has been infused with an absorbtion composition comprising a homogeneous thermal reaction product of an oil component selected from the group consisting of glycerides, fatty acids, alkenes, and alkynes, and a methacrylate or acrylate polymer component; the contaminant being thereby immobilized at the media. Filter configurations incorporating the above described compositions (hereinafter referred to as "absorbent compositions") may be based on various water permeable substrates, such as shredded, spun or otherwise configured polypropylene or shredded or spun cellulose, which substrates are infused or otherwise treated with the absorbent compositions, which are then cured. These substrates may then be packed or otherwise disposed in a cartridge or canister filter; or can be formed into cured and infused bag filters which can be emplaced in canisters through which the contaminated bilgewater is flowed. Similarly the said absorbent compositions can be incorporated into or upon other filtering substrates and media, such as paper, including compressed pulp materials, particulate porous foamed plastics, mineral particulates such as perlite and vermiculite, and particulate, fibrous or porous ceramic or porous (e.g. sintered) metal substrates and media.

It should be appreciated that the use herein of the term "absorbent composition" is one of convenience for identifying the compositions of my aforementioned patents. The specific mechanism by which the noxious contaminants are removed from the bilgewater streams by conjunctive use of the "absorbent compositions" is not completely understood, and could include attachment and/or fixation of such contaminants by mechanisms which technically involve various physical and/or chemical interactions. The term "absorbent" as used herein is intended to encompass all of these possible mechanisms.

In the course of utilizing bilgewater filtration systems, including those based upon the foregoing principles, it is often difficult to determine the quality of effluent from oily water separators without relying on sensor readings. It is often not possible even to determine visually if the unit is on or off. Inability to perform visual inspection has resulted in accidental oily bilge water discharge and even criminal prosecution. In the case of oily water treatment devices it is not possible to effectively use transparent sight gauges or glass indicators on the housings or in the connecting piping due to the tendency of the surfaces over which the discharge flows to become opaque from oily fouling.

SUMMARY OF INVENTION

Now in accordance with the present invention a visual bilge water quality indicator is provided for examining and evaluating the quality of treated effluent flowing in a bilge water filtration system which includes at least a first (i.e. "primary") filtration stage for removing oily contaminants. The visual indicator can be positioned at any point in the filtration system flow stream where a visual determination is sought regarding the presence and degree of the oily contaminants. Normally (although not necessarily) such examination will be conducted at a point preceding the OCM (oil content monitor) commonly used at the bilge discharge point. The visual indicator preferably is positioned to effect its evaluation at the output line of the said primary filtration stage. A bypass or shunt line is typically connected to divert a test stream from the primary filtration stage output line and return the diverted flow back to the output line of the filtration system. The visual indicator of the invention includes at least a first filtration status chamber connected inline at the bypass line. The status chamber includes a filtration media adapted to absorb said oily contaminants, and a transparent outer wall to enable viewing of the interior of the chamber. The filtration status chamber preferably has means for channeling the flow received therein in a direction which proceeds from the chamber outside wall toward its central axis, whereby oily contaminants in the flow collect selectively at the outermost portions of the filtration media where they are highly visible to an operator or inspector. The filtration media is preferably a fluid-pervious filtration media as referenced in the applicant's above patents, which has thus been infused with an absorbtion composition as also referenced. Furthermore however, the media may include a fluorescent or phosphorescent pigment, whereby the presence of captured oily contaminants is visually enhanced, and can be further augmented by rendering a UV light source incident on the media by passing such radiation through the substantially UV transparent walls of the status chamber. Use of the preferred filtration media just cited is especially significant in that oily droplets are immobilized at the outer surface of the filter, allowing for easy visual detection.

In one presently preferable embodiment of the visual indicator apparatus, the bilge water filtration system includes at least a second (or "secondary") filtration stage in series with the first stage; each filtration stage being provided with the said filtration media. The bypass line is connected between the output line from the first stage and the flow output line from the downstream second stage; the said visual water quality indicator comprising a pair of the filtration status chambers serially connected in the bypass line. Visible oil at the first status chamber indicates saturation of the first filtration stage, allowing optimization of filter use efficiency. The second status chamber is always kept transparent until complete loading and supersaturating breakthrough of the first status chamber due to the ability of the filtration media to permanently capture oil without re-entrainment. The absence of oily contaminants in the downstream of the two status chambers indicates that there has not been a breakthrough of oily contaminants from the first to the second filtration stage and thus that the output flow from the filtration system is substantially free of the oily contaminants. Alternatively, the presence of visually discernible oily contaminants at both of the filtration chambers indicates that there has been a breakthrough of the oily contaminants from the first filtration stage, which therefore is in need of servicing.

BRIEF DESCRIPTION OF DRAWINGS

The invention is diagrammatically illustrated, by way of example, in the drawings appended hereto, in which:

FIG. 3 is a further schematic elevational view of the second filtration stage portion of the system of FIG. 1, but showing additional features of the filtration stage and the visual quality indicator associated therewith;

FIG. 3A is a top plan view of the device of FIG. 3;

FIGS. 3B and 3C are plan and elevational views of the support means used with the FIG. 3 device;

DESCRIPTION OF PREFERRED EMBODIMENTS

Figure 1:
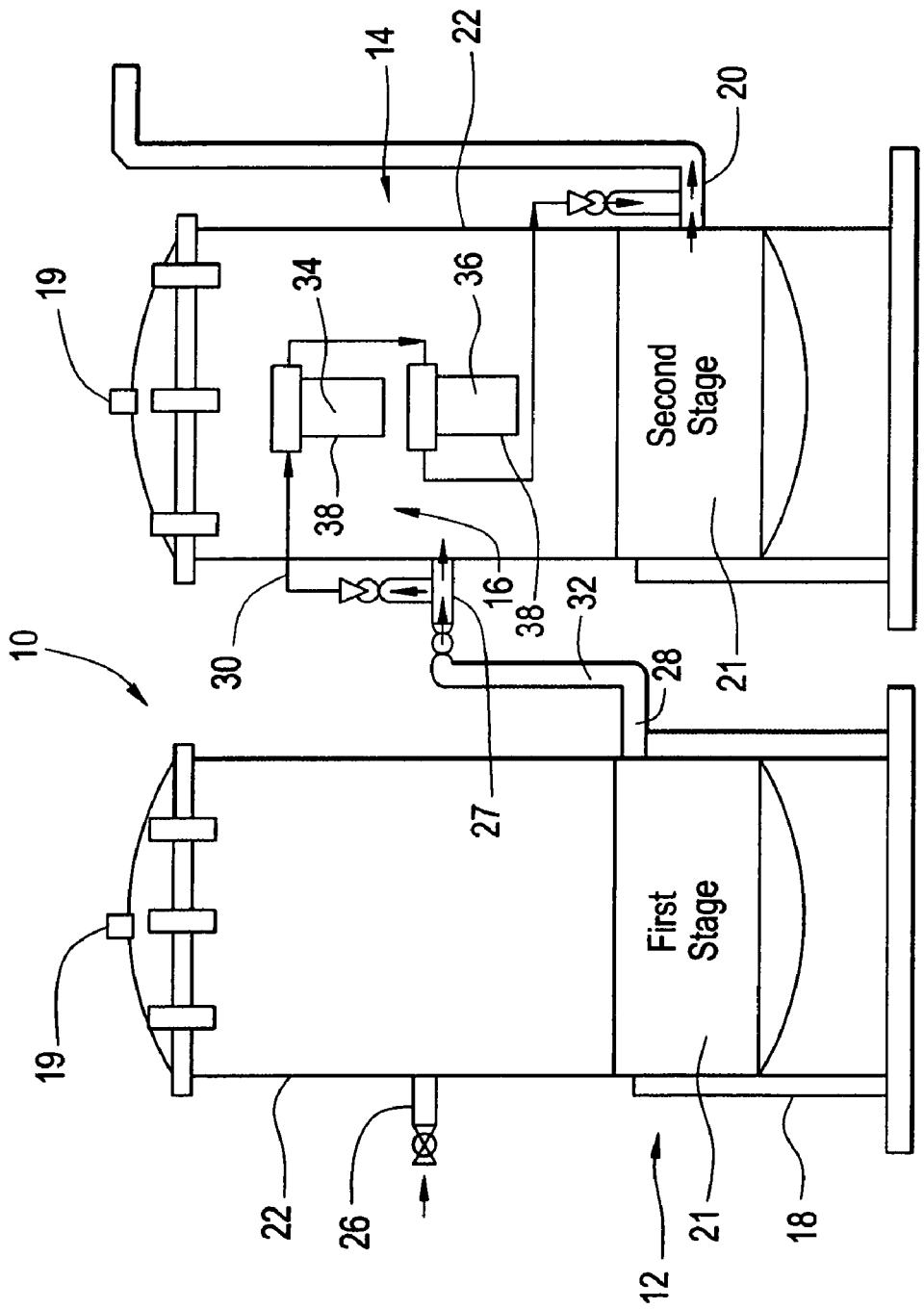
FIG. 1 is simplified schematic elevational view of a bilgewater filtration system incorporating a visual bilgewater quality indicator in accordance with the present invention.
Figure 2:
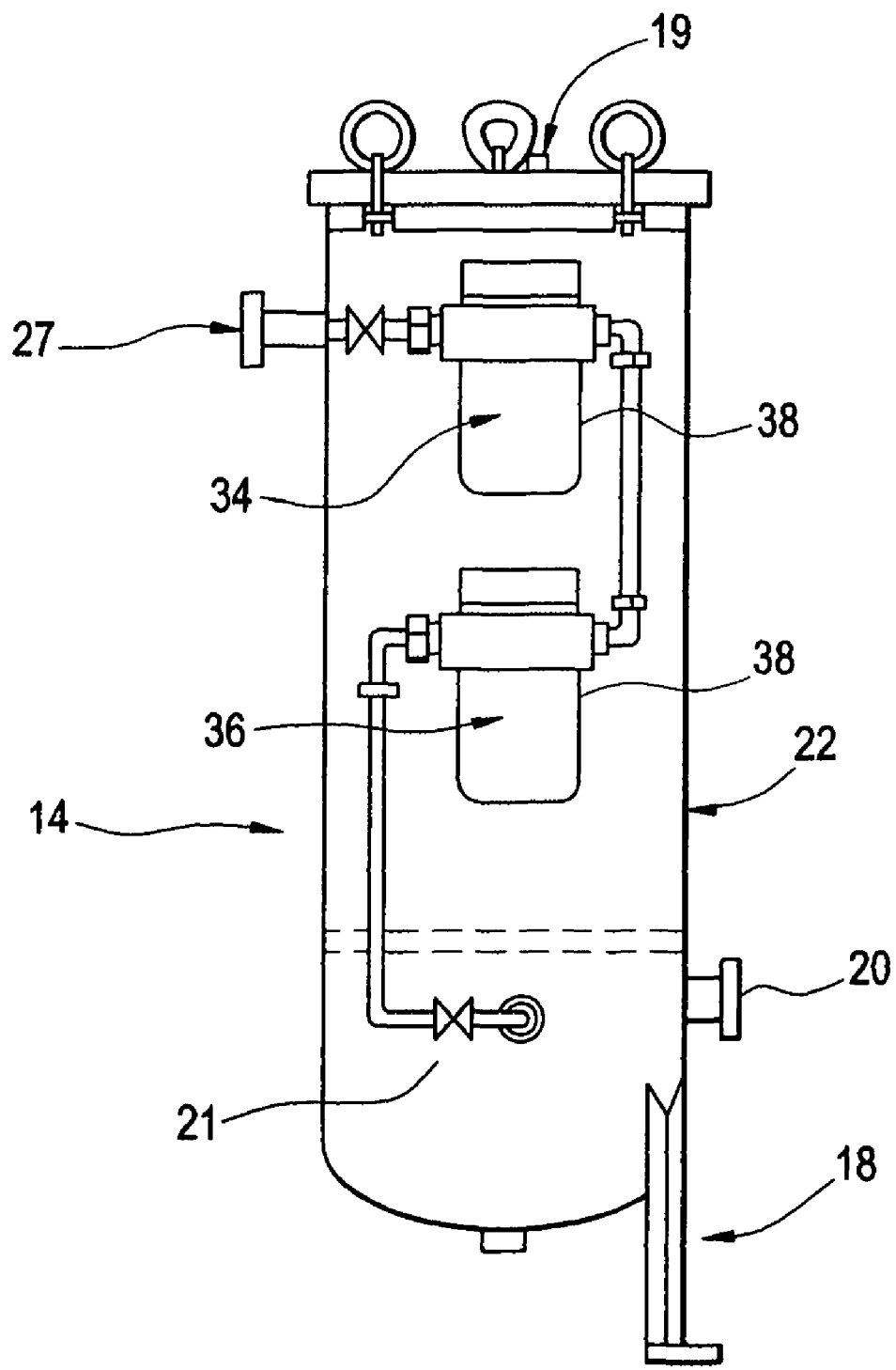
FIG. 2 is a simplified schematic elevational view of the second filtration stage portion of the system of FIG. 1.

In a preferred embodiment of the invention illustrated in the drawings, a visual bilgewater quality indicator is provided, which utilizes a by-pass shunt composed of two filtration status chambers in series, each of which are provided with fluorescent or phosphorescent dye treated filtration media. These filters can be of the types discussed in my aforementioned U.S. Pat. No. 6,475,393 patent, wherein the filtration media is also treated with a fluorescent or phosphorescent dye having very high visibility such as a "hot pink" The filters can also be of the types disclosed in the present inventor's copending patent application Ser. Nos. 11/180,301 and 11/181,372, filed respectively on Jul. 13, 2005 and Jul. 14, 2005. Oil droplets as small as one micron, are captured and immobilized by the primary filter and are instantly visible against the hot pink or similar high visibility background of the exemplary dye previously mentioned. Due to the ability of the infused media to permanently capture oil with out re-entrainment, the secondary filter chamber is always kept transparent until complete loading, and supersaturating breakthrough of the primary chamber. Oily droplet visibility can be further enhanced with ultraviolet illumination as mentioned.

The schematic view of FIG. 1 thus shows a bilgewater treatment unit 10 with which the present invention may be utilized. Unit 10 is composed of two in series filtration stages 12 and 14 and is deployed following one or more conventional OWS units (Oily Water Separators—not shown) in order to ensure discharge of no greater than around 15 ppm oil. Legs 18 are affixed to each support stages 12 and 14. The primary stage 12 receives the flow from the OWS at its input port 26 and removes the bulk of the oil loading. The secondary stage 14 receives the output flow from stage 12 and polishes any breakthrough as necessary. These units are self-activating, and are not consumed outside the presence of oil. The visual indicator generally shown at 16 is driven by the pressure difference between the effluent port 28 of the first stage 12 and the effluent port 20 of the second stage 14. The visual indicator 16 allows one to visually inspect the quality of the effluent leaving the first filtration stage 12 and the degree of loading being imparted to the second filtration stage 14 filters and the degree of saturation of the primary filtration stage 12. A 15-ppm conventional oil content monitor (OCM) is provided (not shown) at the final discharge point from unit 10 and controls the OWS unit or units. This visual inspection allows one to correlate the OCM reading with the visual appearance of the first chamber effluent. Use of the visual indicator 16, allows one to monitor effluent quality, filter loading and degree of emulsification.

The filtration stages 12 and 14 with which the invention is used are per se devices which are generally of types which are commercially available from the Mycelx Corporation, assignee of the present invention, except that the connections to these stages have been modified to enable incorporation of the visual inspection device 16 of the present invention. Referring e.g. to FIG. 3 the filtration stage 14 is shown as including an outer shell 22 which internally houses four filter cartridges, one of which is seen at 24. Stage 12 similarly includes four such filter cartridges. The filtration cartridges 24 are of the type disclosed in the present inventor's U.S. patents as discussed in the foregoing. Each filtration stage 12 and 14 is provided with a top vent 19 and a bottom fluid collection volume 21. The stream from the OWS to be treated enters at the input port 26 of stage 12 and after flowing through the in parallel filter cartridges 24 and collecting in volume 21 exits at output port 28 and then passes via line 32 to input port 27 of stage 14. It is seen however that a bypass line or shunt 30 is provided where the connection line 32 enters the second filtration stage 14 so that a test stream may be diverted outside shell 22 of the second stage and thence through two in series connected filtration status chambers 34 and 36, each of which is provided with a transparent shell 38 formed of a tough plastic material such as a polycarbonate.

Figure 4:
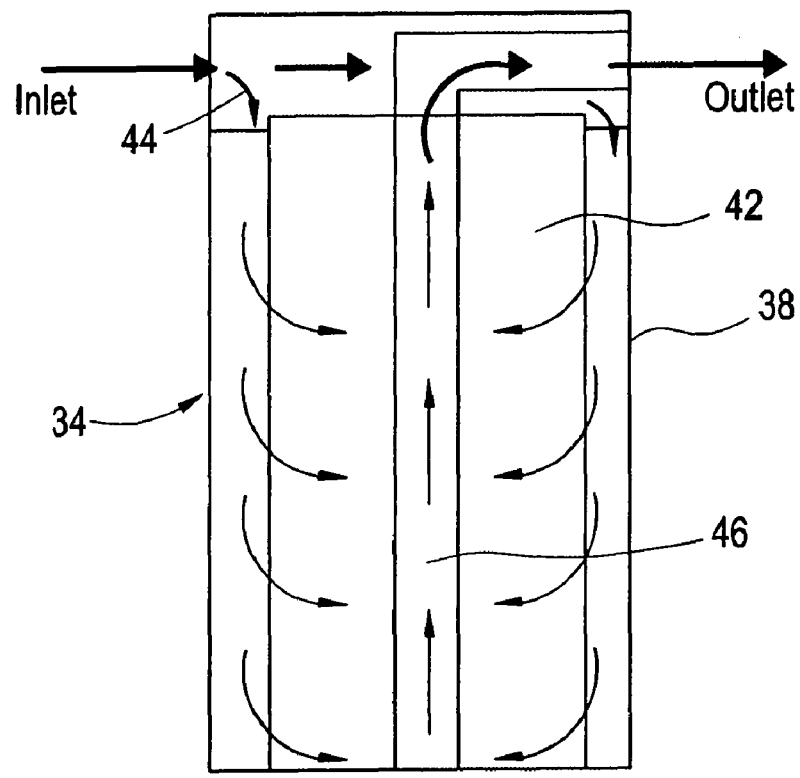
FIG. 4 is a simplified schematic longitudinally cross-sectioned view through one of the filtration status chambers used in the invention.
Figure 4A:
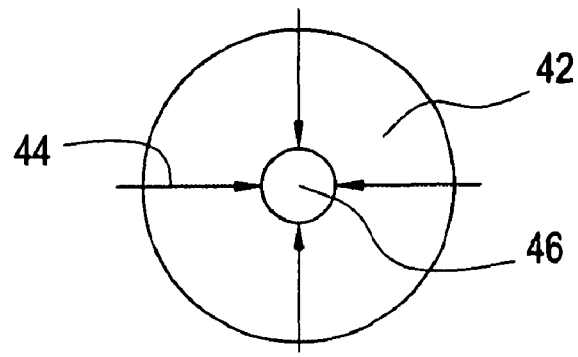
FIG. 4A is a schematic transverse cross section of the FIG. 4 chamber, which has been simplified by not including the outer shell, so as to better show the flow pattern through the chamber.

The filtration status chambers 34 and 36 utilize as filtration media 42 the same absorbent media as in the present inventor's above-cited patents. It is further, however, important for the invention to provide a flow 44 through the chambers which starts at the portions of the filtration media adjacent the chamber outer wall 38 and proceeds radially inward toward the chamber axis 46 where it is collected and then exits. This flow pattern (which for chamber 34 is seen in the simplified schematic views of FIGS. 4 and 4A) assures that discoloration caused by oil in the stream which is collected at the filtration media will rapidly become evident to the operator who views the chambers externally through the transparent walls of each. Visible oil at the first detection chamber indicates saturation of the first stage bilge treatment cartridge filters, allowing optimization of filter use and efficiency. The arrangement of the invention thereby prevents premature change over of filters and allows detection of breakthrough.

In a further aspect of the invention, the filtration media 42 in the status chambers 34 and 36 preferably include a highly visible fluorescent or phosphorescent dye, such as a "hot pink" dye. This not only assures that the operator can readily see even a slight discoloration produced by captured oil droplets, but permits further augmentation and amplification of visibility effects by the expedient of illuminating the media with UV light by rendering such radiation incident at the media through the visually transparent walls 38, which are also selected to be substantially transparent at the UV wavelengths used.

While the present invention has been set forth in terms of specific embodiments thereof, the instant disclosure is such that numerous variations upon the invention are now enabled to those skilled in the art, which variations yet reside within the scope of the present teaching. Thus as already mentioned, while the illustrated embodiment of the invention incorporates two filtration stages, the invention can also be effectively utilized in a single filtration stage system, or in systems employing more than two stages. Similarly it should be clear that the visual indicator of the invention can comprise a single filtration status chamber such a chamber 34 or 36, which can be used in any bilge filtration system where one seeks to effect a visual determination of oily components in the stream flowing through the filtration system. Furthermore it will be evident that the visual indictor device of the invention can be used to examine aqueous streams other than bilge discharges which carry oily contaminants, as for example streams of this type which are discharged or otherwise handled by industrial facilities or the like.

Accordingly, the invention is to be broadly construed and limited only by the scope and spirit of the present disclosure and the claims appended hereto.

The invention claimed is:

1. For use in a filtration system for removing oily contaminants from an aqueous medium, said system including at least a first filtration stage for removing said oily contaminants; a visual effluent water quality indicator for examining and evaluating the quality of treated effluent flowing at the output line of said first filtration stage, comprising:

a filtration status chamber inserted in said output line, said chamber having a transparent outer wall to enable viewing of the interior of the chamber; said chamber including a filtration media adapted to absorb said oily contaminants, said filtration media comprising a fluid-pervious media which has been infused with an absorption composition comprising a homogeneous thermal reaction product of an oil component selected from the group consisting of glycerides, fatty acids, alkenes, and alkynes, and a methacrylate or acrylate polymer component; the contaminant being thereby immobilized at the said filtration media; and said filtration status chamber having means for channeling the flow received therein in a direction proceeding from the chamber lateral walls toward its central axis, whereby any of said oily contaminants in the flow collects selectively at the outer portions of the filtration media which are highly visible to an operator of the system.

2. A visual effluent water quality indicator in accordance with claim 1, wherein the said filtration media includes a highly visible fluorescent or phosphorescent dye or pigment, whereby the visual presence of captured oily contaminants is augmented.

3. A visual effluent water quality indicator in accordance with claim 2, wherein the said outer wall is substantially transparent to UV radiation, whereby the external visibility of contaminants collected at said filtration media may be augmented by rendering UV light incident on said media from an external UV source.

4. A visual indicator device for determining the presence of oily contaminants in an aqueous stream, comprising:

a status chamber for receiving and passing said stream therethrough, said chamber having a transparent outer wall to enable viewing of the interior of said chamber;

said chamber having a fluid pervious filtration media adapted to absorb said oily contaminant, said filtration media being infused with an absorbtion composition comprising a homogeneous thermal reaction product of an oil component selected from the group consisting of glycerides, fatty acids, alkenes, and alkynes, and a methacrylate or acrylate polymer component; the contaminant being thereby immobilized at the media; and said filtration status chamber having means for channeling the flow of the said stream received therein in a direction proceeding from the chamber lateral walls toward its central axis, whereby any of said oily contaminants in the flow collects selectively at the outer portions of the filtration media which are highly visible to an observer.

5. A visual indicator device in accordance with claim 4, wherein the said media includes a highly visible fluorescent or phosphorescent dye or pigment, whereby the visual presence of captured oily contaminants is augmented.

6. A visual indicator device in accordance with claim 5, wherein the said outer wall is substantially transparent to UV radiation, whereby the external visibility of contaminants collected at said filtration media may be augmented by rendering UV light incident on said media from an external UV source.

* * * * *